United States Patent
Bastani et al.

[11] Patent Number: 6,035,005
[45] Date of Patent: Mar. 7, 2000

[54] RECEIVER WITH BASEBAND I AND Q DEMODULATOR

[75] Inventors: Babak Bastani, Weston; Edwin E. Bautista, Aventura, both of Fla.

[73] Assignee: Motorola, Inc., Schamburg, Ill.

[21] Appl. No.: 08/797,145

[22] Filed: Feb. 10, 1997

[51] Int. Cl.[7] ................................. H04L 27/06
[52] U.S. Cl. .................. 375/340; 375/324; 375/328; 708/490; 708/801
[58] Field of Search .................. 455/324, 214, 455/259; 375/324, 328, 340, 345, 344; 329/323, 327, 346, 302; 341/172, 118, 143; 364/736.01, 807; 708/490, 801

[56] References Cited

U.S. PATENT DOCUMENTS

| | | | |
|---|---|---|---|
| 4,439,756 | 3/1984 | Shenoi et al. | 341/143 |
| 4,521,892 | 6/1985 | Vance et al. | 375/324 |
| 4,583,239 | 4/1986 | Vance | 375/324 |
| 5,150,324 | 9/1992 | Takasuka et al. | 708/801 |
| 5,222,253 | 6/1993 | Heck | 455/78 |
| 5,668,749 | 9/1997 | Corleto et al. | 708/490 |

OTHER PUBLICATIONS

Seyfi Bazarjani et al., A 1V Switched–Capacitor delta–sigman Modulator, IEEE Conference, P70–71, Jun. 1995.

*Primary Examiner*—Stephen Chin
*Assistant Examiner*—Shuwang Liu
*Attorney, Agent, or Firm*—M. Mansour Ghomeshi

[57] ABSTRACT

A baseband demodulator receives inphase and quadrature signals I (116) and Q (117) representing a phase angle and amplitude. The demodulator (114) includes a discrete time continuous amplitude circuit (223, 253, 260) coupled to the quadrature generator to extract a sign information by processing the quadrature components (116 and 118). An accumulator 404 uses the sign information to manipulate predetermined phase angles stored at a memory component 402 to determine the phase angle carried by the I and Q components (116 and 118). As such, the need for up converters or complex analog-to-digital converters is eliminated in direct conversion receivers.

11 Claims, 4 Drawing Sheets

RECEIVER WITH BASEBAND I AND Q DEMODULATOR

TECHNICAL FIELD

This invention is in general related to radio frequency receivers and more particularly to direct conversion receivers.

BACKGROUND

In Zero Intermediate Frequency (ZIF) and direct conversion receivers it is necessary to obtain accurate phase frequency and amplitude information from the baseband analog, In phase (I) and Quadrature phase (Q) signals. Typically, this objective is accomplished by up-converting the signal to some intermediate frequency and then demodulating the signal at that intermediate frequency. This approach utilizes up mixers and bandpass filters as well as a discriminator. The discriminator is used to demodulate the signal to recover the transmitted information. The up-conversion technique adds unreasonable complexity to the receiver and as such is not highly desired in today's cost efficient devices. The move towards audio signal processing requires the digitization of the signal utilizing analog to digital (A/D) converters. Often enough this approach is cost prohibitive. An alternative approach has been to digitize the I and Q signals and then use some digital technique to obtain the phase and frequency information. This too adds significant complexity to the receiver resulting in an unacceptably high cost. It is therefore desired to have a direct conversion receiver that does not use up conversion or costly analog-to-digital converters.

DETAILED DESCRIPTION OF THE PREFERRED EMBODIMENT

In recovering information from a baseband signal, designers often use complex analog-to-digital converters or frequency up-converters along with bandpass filters. In addition to being expensive, both of these approaches are complex and demand large IC areas to implement and are therefore unattractive in today's cost and volume efficient receiver designs. The present invention overcomes these problems by providing digital phase and amplitude information from analog I and Q utilizing a discrete-time continuos-amplitude circuit without A/D converters. This approach results in a significant reduction in the complexity and therefore size and cost of components of direct conversion receivers as compared to the circuits of the prior art. To better understand this scheme, reference is made to a series of drawings where like numerals are carried forward.

Figure 1:
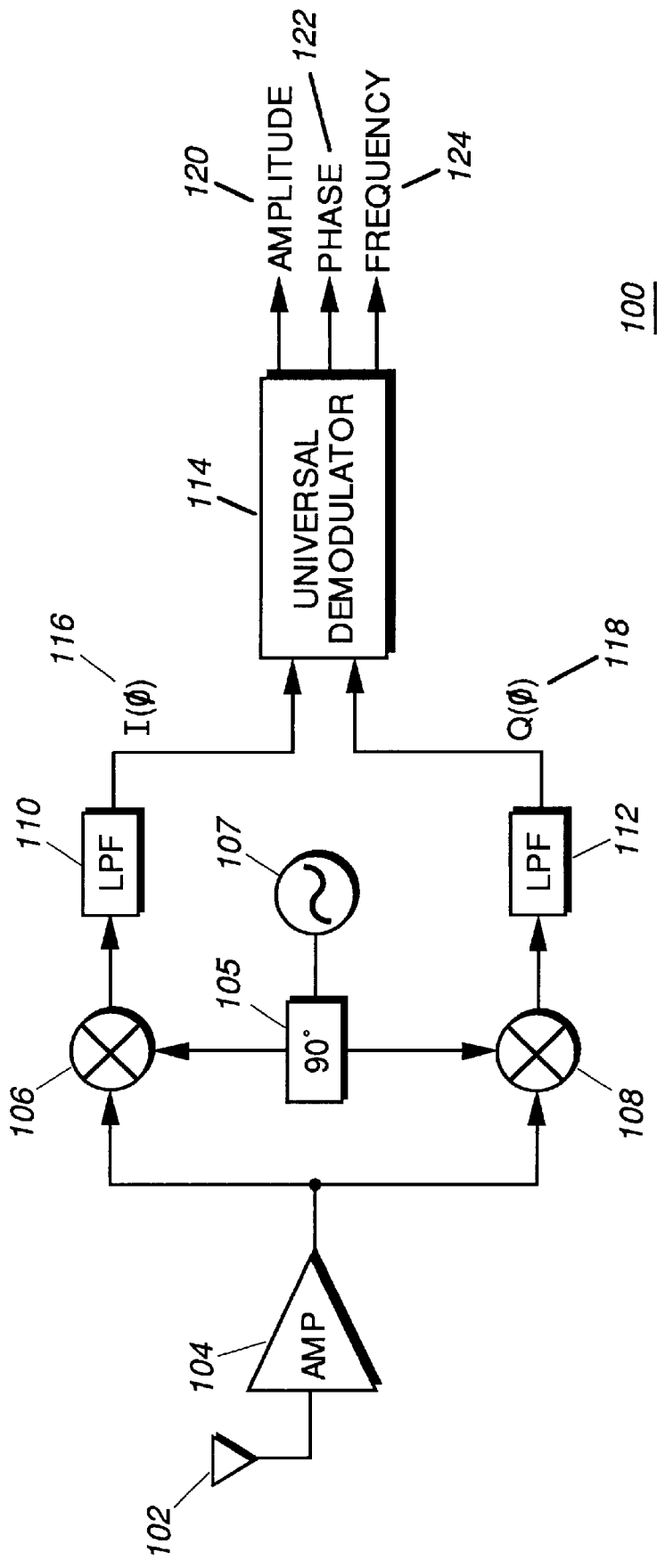
FIG. 1 shows a receiver in accordance with the present invention.

Referring now to FIG. 1, a direct conversion receiver 100 is shown. A radio frequency signal received at an antenna 102 is amplified by a radio frequency amplifier 104 and down converted via the quadrature down mixers 106 and 108. An oscillator 107 and a 90° phase shifter 105 are used to provide appropriate local oscillator signals. The output of mixers 106 and 108 are filtered via baseband filters 110 and 112 before they are applied to a universal demodulator 114. In general, the output of filter 110 constitutes the In phase component (I) 116 of the received radio frequency signal. The output of the baseband filter 112 constitutes the Quadrature component (Q) 118. Each of these quadrature components has an amplitude and a phase angle. The information carried by the radio frequency signal is now contained in the I and Q signals. The universal demodulator 114 takes these I and Q components and produces amplitude information 120, phase information 122, and frequency information 124.

Figure 2:
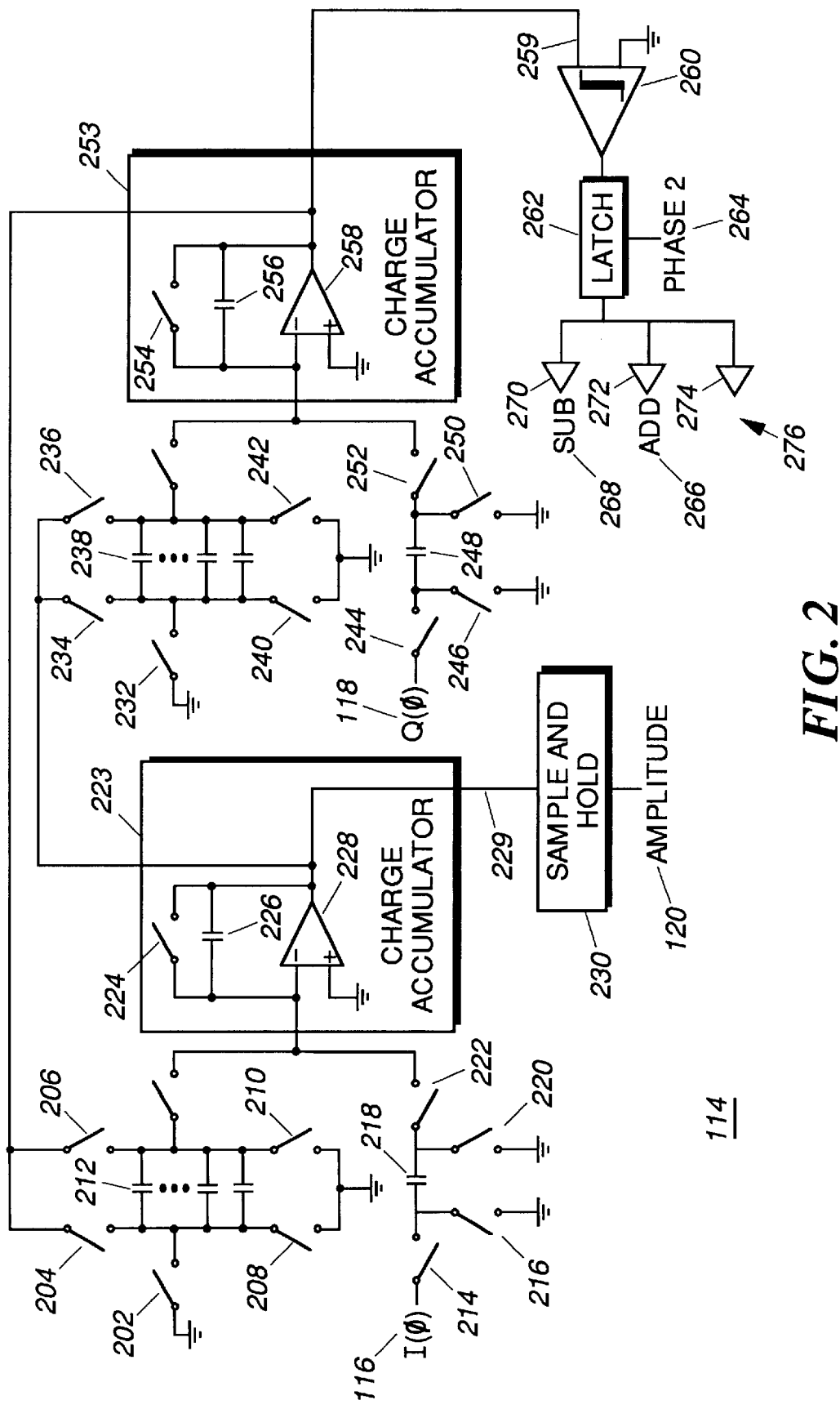
FIG. 2 shows a demodulator in accordance with the present invention.
Figure 3:
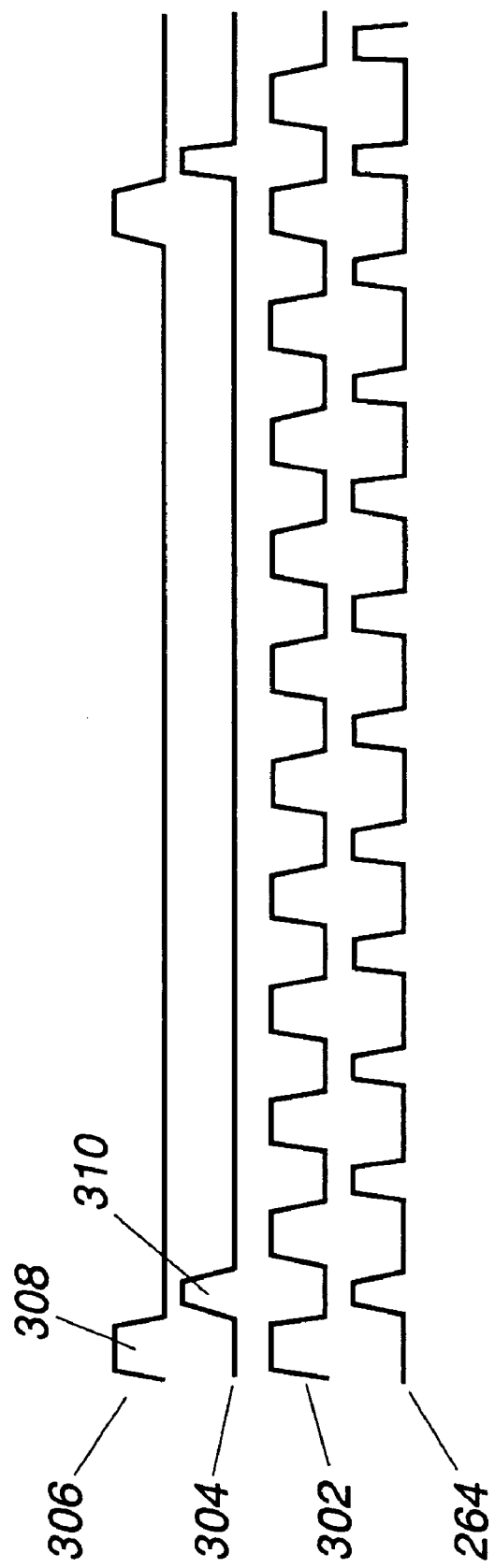
FIG. 3 shows a timing diagram used by the demodulator of FIG. 2.

Referring to FIGS. 2 and 3, the components of the demodulator 114 and a timing diagram are shown, respectively. The demodulator 114 samples the I and Q components 116 and 118 as charge on capacitors 218 and 248 on clock phase 308. During this clock cycle 308, switches 214 and 220 are closed and the capacitor 218 is charged to the level of the I component 116 whilst switches 216 and 222 are on the opposite phase of that clock cycle and are therefore open. A similar condition exists for the Q channel 118 where switches 244 and 250 are closed and the capacitor 248 is charged to the level of the Q channel 118 whilst switches 246 and 252 are on the opposite phase of that clock cycle and are therefore open. At the same time any charges on capacitors 226 and 256 are removed via switches 224 and 254 which short out the capacitors 226 and 256.

On pulse 310, of clock 304, the charges on capacitors 218 and 248 are transferred to capacitors 226 and 256, respectively. This is intended to initialize each charge accumulator 223 and 253, respectively. The charge accumulator 223 consists of an operational amplifier 228, a capacitor 226 and the switch 224. Conversely, the charge accumulator 253 includes an operational amplifier 258 and the capacitor 256 plus switch 254. The present invention aims to extract a sign information of at least one of these quadrature components utilizing this discrete-time continuous amplitude circuit 114. Utilizing this sign information, the circuit 114 manipulates a predetermined phase angle until the phase angle of the received signal is obtained. In other words, upon several iterations of extracting additional sign information and manipulating the predetermined phase angle, the eventual phase angle relative to the received information is obtained.

The first iteration (N=1) begins with a comparison made between the output of the Q channel charge accumulator 259 and an analog ground (Vag). If the level at the input 259 is greater than the Vag of comparator 260, then on the high cycle of clock 302, capacitors 212 and 238 are charged to the level available on inputs 259 and 229, respectively. As such, on the high cycle of clock 264 logically ANDed with the low cycle of clock 304, the charge is added to the capacitor 226 to increase the signal at 229 by $2^{-n}$ and charge is subtracted from the capacitor 256 to decrease the signal at 259 by $2^{-n}$. Conversely, if the signal at the input 259 is less than Vag, then capacitors 212 and 238 are charged to the level at inputs 259 and 229, respectively. As such, the high cycle of clock 264 logically ANDed with the low cycle of clock 304, the charge is subtracted from the capacitor 226 to decrease the signal at 229 by $2^{-n}$ and charge is added to the capacitor 256 to increase the signal at 259 by $2^{-n}$.

To achieve an increase or decrease of $2^{-n}$ charge, the appropriate capacitor of $C/2^n$ is switched in within capacitor banks 212 and 238. With capacitors 226 and 256 having a value of C, the effective charge (Q) added or subtracted from the charge accumulator 223 and 253 is $Q/2^n$. For N bits of accuracy, the above process is repeated for N-1 iterations until the phase angle is obtained. Recognizing that the sign of the signal of the input 259 at each iteration implicitly contains the information required to demodulate the phase angle of the quadrature components 116 and 118, the signal at 259 is applied to an accurate comparator 260. The output of this comparator 260 is latched in by a latch 262 which provides the phase information 276 at output of buffers 270, 272, and 274. The phase information 276 is a serial bit stream which is used by a discriminator to obtain phase and frequency of the demodulated signal.

Viewing the operation of the circuit of the present invention, from a different perspective, one can see that the CORDIC (Coordinate Rotation Digital Computer) operations (the interactive equations) are performed using switched capacitor circuits and hence eliminating the need for A/D converters. With no A/D converters the demodulation is performed with much less complexity and at a lower cost with smaller IC area. A significant aspect of the present invention is that the signal 2(n) 259 is applied to an accurate comparator, which extracts the sign information and the latched output from the comparator provides the information to accumulate the signal phase.

Figure 4:
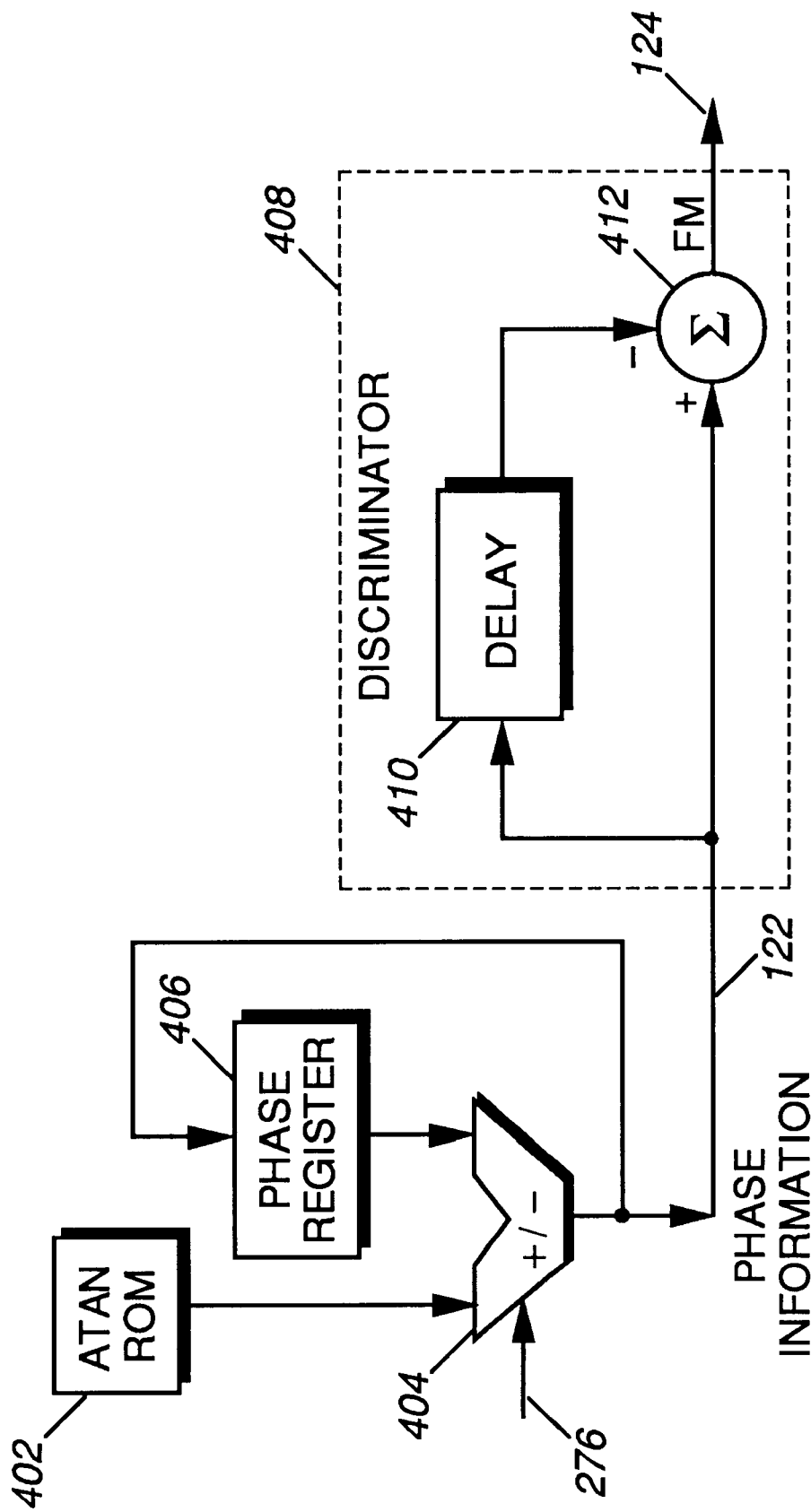
FIG. 4 shows a phase accumulator and discriminator for use with the demodulator of FIG. 2 in accordance with the present invention.

Referring to FIG. 4, one can see how the phase accumulation bits from the comparator 260 can be used to obtain phase and frequency demodulated signal. Specifically, the phase information 276 is applied to an adder/subtractor 404 whose output is fed into a phase register 406. Also available to this adder/subtractor 404 is an arc tangent memory component, such as a Read Only Memory (ROM) 402. The phase accumulation bits 276, a 10 bit parallel representation of the phase and frequency information are used by this setup to obtain phase and frequency information on the demodulated signal. The phase is obtained by having an N-word (N is the number of iterations and determines the accuracy of the demodulator 114) ROM look up table 402 store N predetermined phase angles. These angles are then added to or subtracted from the previous accumulated angle applied by the phase register 406 in the adder/subtractor 404 according to the plurality of the phase accumulation bits 276. The phase information will then be available at the output 122 (FIG. 1) every N clock cycles. The frequency demodulation can then be achieved by applying the phase information 122 to the digital subtractor 412 and subtracting the previous phase supplied by the delay circuit 410 from it. The output 124 will then contain the frequency information. The combination of the digital subtractor 412 and the delay circuit 410 constitutes a discriminator 408. In addition to phase demodulation, amplitude information $\sqrt{(I^2+Q^2)}$ is available with the completion of the N iteration where the output of the sample and hold block 230, i.e. output 120 represents the magnitude of the I and Q components 116 and 118, respectively.

An alternative to this approach would be to simply send the serial data stream (the phase accumulation bits from the comparator 260) to the Digital processor and hence avoid the need for parallel to serial conversion on the receiver circuit and serial to parallel conversion on the digital processor. The signal phase and frequency can then be computed in a digital signal processor from this data stream. This approach, moves the digital signal processing into the cheaper and more standard digital IC process and simplifies the receiver complexity significantly.

To enable the design of the baseband I and Q universal demodulator 114, a comparator has been designed that provides 10 bits of resolutions at a comparison rate 5 Mhz. In addition to phase demodulation, amplitude information $\sqrt{(I^2+Q^2)}$ is also available with the completion of the 10th iteration where the sampled and held value of I(n+1) represents the magnitude of I and Q. This can replace the sum of square circuits in the receiver's automatic gain control. The area occupied by the universal demodulator 114 is less than 20*20 mils in 0.5 Micron BICMos process. This will reduce the chip area by a factor of ⅓ compared to the conventional design where A/D converters and digital demodulators are used. This makes the universal demodulator very attractive in low cost products.

In summary, it can be seen that by utilizing a discrete time continuous amplitude circuit 114 one can accomplish the recovery of information carried by baseband signals I and Q without the need for complex analog-to-digital converters. The circuit utilizing capacitors where the signal represented as charges are manipulated to a desired timing signal. By further processing the charge, a sign of the phase angle is developed which is manipulated to recover the information. This is accomplished without utilizing up converters that have been an alternative to A/D converters. As a result, the cost and area in recovering a baseband signal is significantly reduced.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for recovering phase and amplitude of a baseband signal containing amplitude and phase information, comprising:

providing quadrature components of the baseband signal from any modulated signal and regardless of modulation style each having an amplitude and a phase angle associated therewith;

extracting a sign information of at least one of the quadrature components via a discrete-time continuous-amplitude circuit utilizing a Coordinate Rotation Digital Computer (CORDIC) operation and with no Analog to Digital Converter (A/D);

retrieving a pre-determined phase angle from a memory device;

manipulating the predetermined phase angle utilizing the sign information; and repeating the steps of extracting and manipulating until the phase angle and the amplitude are obtained.

2. The method of claim 1, wherein the step of extracting includes comparing the sign information with a predetermined level.

3. The method of claim 1, further including the step of sampling the amplitude of at least one of the quadrature components and repeating the step of sampling until the amplitude of the baseband signal is determined.

4. A baseband demodulator, comprising:

a quadrature generator to generate quadrature components from any modulated signal representing a phase angle and an amplitude;

a discrete-time continuous-amplitude circuit excluding an A/D circuit coupled to the quadrature generator to extract a sign information by processing the quadrature components, the circuit including a device to perform a CORDIC operation;

a memory device for storing pre-determined phase angles; and an accumulator where the sign information is used to manipulate predetermined phase angles to determine the desired phase angles.

5. The baseband demodulator of claim 4, further including a discriminator responsive to the accumulator to generate a frequency utilizing the phase angle.

6. The baseband demodulator of claim 4, wherein the discrete-time continuous-amplitude circuit includes a switched capacitor circuit.

7. The baseband demodulator of claim 4, wherein the discrete-time continuous-amplitude circuit includes a charge accumulator.

8. The baseband demodulator of claim 4, wherein the discrete-time continuous-amplitude circuit includes a comparator.

9. The baseband demodulator of claim 4, wherein the discrete-time continuous-amplitude circuit includes a sample and hold circuit for providing the amplitude of the baseband signal.

10. The baseband demodulator of claim 4, a phase register where the most recent phase angle is temporarily stored.

11. A communication device, comprising:

a radio frequency circuit to produce a base band signal;

a baseband demodulator, comprising:

a quadrature generator to generate quadrature components from any modulated signal representing a phase angle and an amplitude;

a discrete-time continuous-amplitude circuit excluding an A/D circuit coupled to the quadrature generator to extract a sign information by processing the quadrature components, the circuit including a device to perform a CORDIC operation;

a memory device for storing pre-determined phase angles; and an accumulator where the sign information is used to manipulate predetermined phase angles to determine the desired phase angle.

* * * * *